Figure 1:
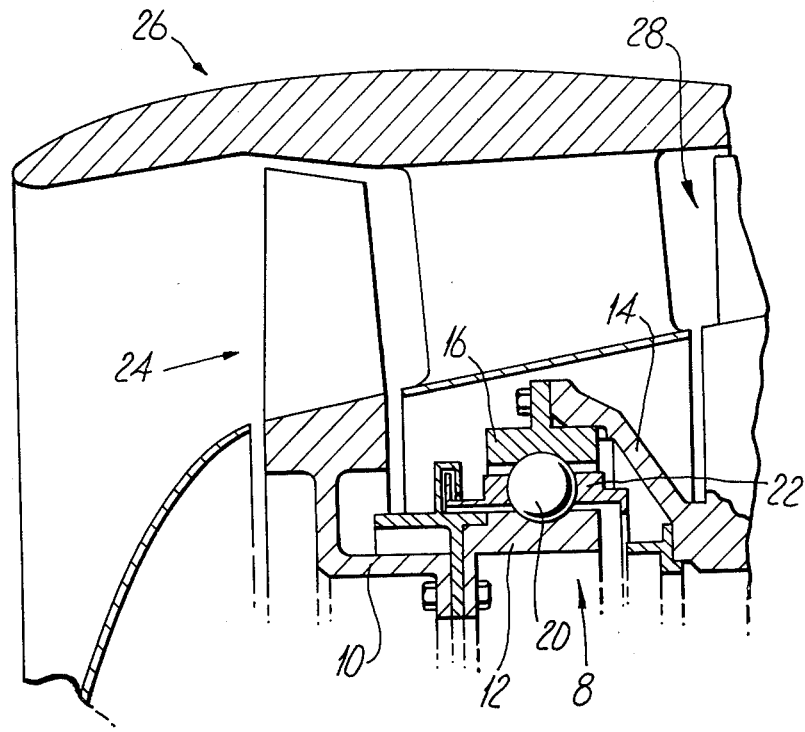

United States Patent [19]

Briggs

[11] 4,322,117

[45] Mar. 30, 1982

[54] THRUST BEARING

[75] Inventor: Jack Briggs, Belper, England

[73] Assignee: Rolls-Royce Limited, London, England

[21] Appl. No.: 196,115

[22] Filed: Oct. 10, 1980

[30] Foreign Application Priority Data

Nov. 17, 1979 [GB] United Kingdom ............... 39868/79

[51] Int. Cl.³ ............................................. F16C 19/10
[52] U.S. Cl. .................................... 308/233; 308/187; 308/235
[58] Field of Search ............... 308/233, 235, 187, 230, 308/201, 189 R, 225

[56] References Cited

U.S. PATENT DOCUMENTS

| | | | |
|---|---|---|---|
| 3,414,341 | 12/1968 | Murphy | 308/235 |
| 3,471,208 | 10/1969 | Vannest | 308/201 |
| 3,503,661 | 3/1970 | Taylor et al. | 308/201 |
| 4,027,932 | 6/1977 | Kunkel et al. | 308/233 |

Primary Examiner—Lenard A. Footland
Attorney, Agent, or Firm—Cushman, Darby & Cushman

[57] ABSTRACT

Thrust bearings need to be under axial load to prevent skidding of the balls in the races. In a gas turbine engine, the thrust bearings between relatively rotatable shafts can experience zero load as engine conditions vary. A permanent load is therefore applied by causing an extension 38 of cage 22 to run in an oil reservoir 30. The resultant drag applies a torque to the cage and affects its speed of rotation relative to that of the shafts 10 and 14.

6 Claims, 3 Drawing Figures

THRUST BEARING

This invention is concerned with thrust bearings suitable for use between relatively rotatable shafts.

More specifically, the invention is concerned with a thrust bearing which for operation, is situated between a pair of shafts both of which rotate, but at different speeds, relative to each other.

The invention is particularly suitable, though not restrictively so, for use in a ducted fan, gas turbine engine.

During operation, thrust bearing balls depend on loads being exerted on them in directions normal to lines radially of the axis of rotation of the bearing in order to avoid skidding of the balls on either of the bearing race tracks. The present invention seeks to provide a thrust bearing wherein such loading is achieved.

According to the present invention, a thrust bearing suitable for supporting a pair of relatively rotatable shaft comprises an inner race adapted for fixing to a first rotatable shaft, an outer race adapted for fixing to a further rotatable shaft, a cage containing a plurality of balls between said races and, an annular fluid reservoir adapted for co-rotation with one of said races and wherein said cage has an annular extension which rotates within said fluid reservoir and which, on contact with fluid therein, has a braking torque imparted to it through friction, which reduces the speed of rotation of said cage and balls, relative to the speed of rotation of said races.

Preferably said one race is the inner race.

Preferably the fluid is lubricating oil for lubricating said bearing and, in operation, is directed from said bearing via said fluid reservoir to drains.

The first shaft may be a fan shaft of a ducted fan, gas turbine engine and, the further shaft is a shaft of a compressor downstream of the fan of the same engine.

Figure 2:
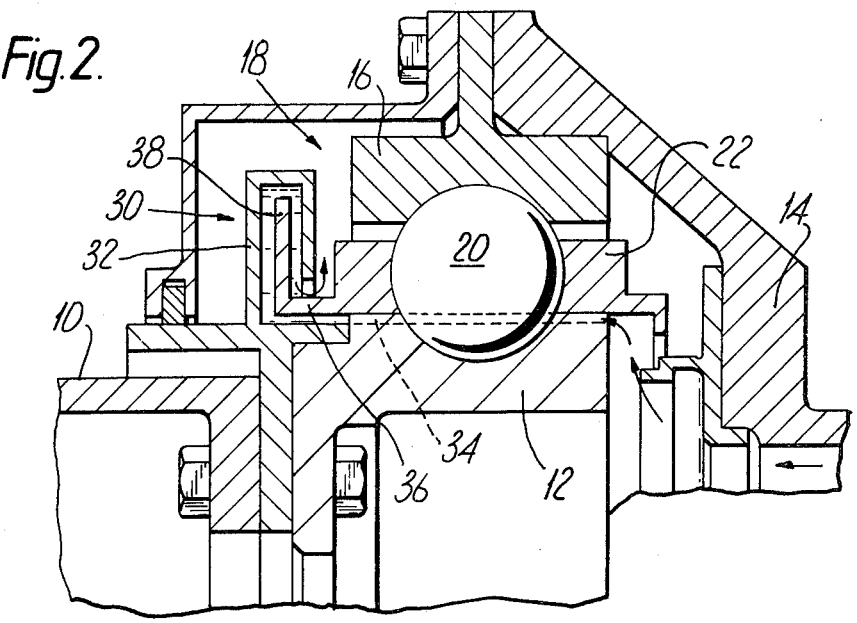
Figure 3:
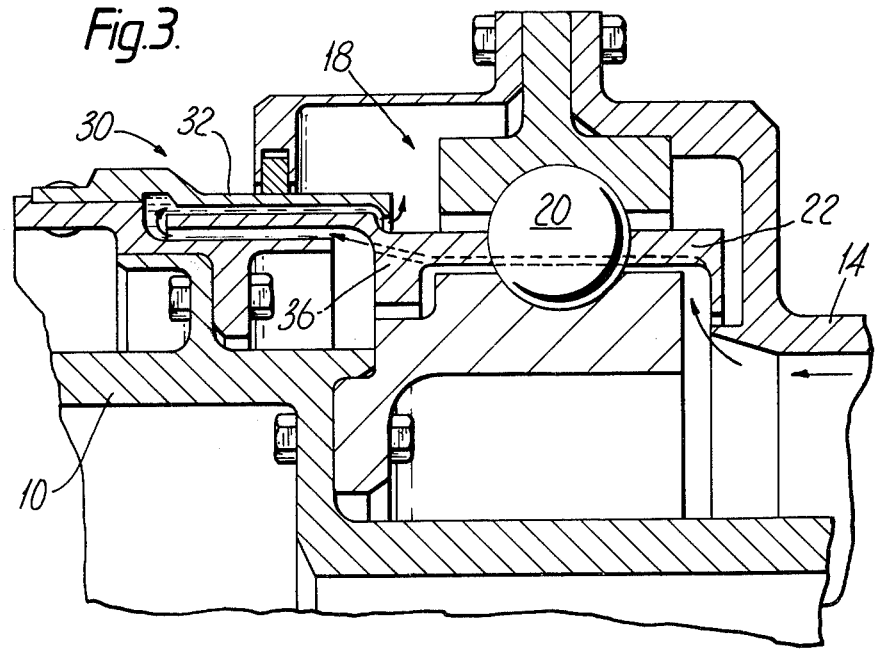

The invention will now be described, by way of example and with reference to the accompanying drawings in which:

FIG. 1 is a diagrammatic, cross-sectional part view, of a ducted fan, gas turbine engine including an embodiment of the present invention, FIG. 2 is an enlarged, part view of the ducted fan, gas turbine engine of FIG. 1, FIG. 3 is a view corresponding to FIG. 2, but showing an alternative embodiment of the invention.

Referring to FIG. 1. A shaft 10 carries a stage of fan blades 24 of a ducted fan, gas turbine engine 26 and, a shaft 14 is the shaft of a compressor of engine 26.

A bearing 18 is located between shafts 10 and 14. Bearing 18 has an inner race 12 fixed to shaft 10, an outer race 16 fixed to shaft 14 and, a cage 22 enclosing balls 20 and maintaining balls 20 in equi-angular spaced relationship, about the axis of rotation of shafts 10 and 14.

Referring now to FIG. 2. A fluid reservoir 30 is arranged between shaft 10 and inner race 12 so as to be effectively integral with the shaft and inner race, and therefore, will rotate with them. Fluid reservoir 30 has an annular inverted 'U' shaped portion 32 which receives lubricating oil which has passed across cage 22 via channels 34 as indicated by arrows, which channels are shown in dotted lines.

The annular, inverted 'U' portion 32 is positioned at that side of bearing 18 from which lubricating oil is ejected and returned to drains.

Cage 22 has an annular portion 36 the free end of which, terminates in an annular flange 38 which lies within the inverted 'U' shaped portion 32 and during rotation, is immersed in oil which is held in the reservoir by centrifugal force.

Shaft 14, being the compressor shaft, rotates at a higher speed than shaft 10. However, fan stage 24, in moving a large mass of air rearwards, exerts an axial force on inner race 12, which tends to move the race to the left as viewed in the drawing. The relative axial movement between the two races 12 and 16, urges the balls 20 against the opposing sides of the tracks of respective races and prevents skidding of the balls 20 on the surfaces of the tracks.

There are points in the operation of a ducted fan, gas turbine engine, where the axial loads are reversed. There results a transient point in which no axial load is applied. However, bearing 18 along with shafts 10 and 14, is still rotating. Therefore only centrifugal force is acting on balls 20, to urge them against the track of outer race 16.

The urging of balls 20 against the track of outer race 16, would normally cause the balls 20 to rotate bodily at or about the same speed as outer race 16 and shaft 14, with resultant skidding of the balls on the track of inner race 12. However, a torque load is applied to flange 38, due to the friction developed between the flange and the oil in reservoir 30, as flange 38 rotates therein. The torque load is transferred via flange 38, to cage 22 and in turn, to balls 20. Cage 22 and balls 20 are thus braked and caused to rotate at a slower speed than shaft 14 and its associated outer race 16. By virtue of the braking load and centrifugal load, a coupling force is applied to each ball 20 which causes them to rotate at a speed such that they roll around inner race 12 without skidding.

It is important that the annular flange 38 has sufficient surface area engaging with the oil, so that friction therewith generates the required torque load.

It is also important, to ensure a sufficient flow of oil through reservoir 30, to remove heat generated by the friction. If this is not done, the oil will overheat and viscosity will be reduced, and therefore, friction will be lost.

FIG. 3 depicts a further embodiment of the invention wherein the 'U' shaped portion 32 is in the form of a hollow annulus arranged coaxially with the axis of rotation of the assembly.

The annular cage extension 36 has a free end which resides in the 'U' shaped portion 32. Lubricating oil is fed along the path indicated by arrows, into the portion 32 so as to run along the inner surface of extension 36, over its edge, along the outer surface, to be ejected into the drains circuit.

One surface only of the annular extension 36, may be placed in contact with the oil, provided that the surface has sufficient area to ensure the development of torque through friction.

I claim:

1. A thrust bearing suitable for supporting a pair of relatively rotatable shafts, comprising an inner race adapted for fixing to a first, rotatable shaft, an outer race adapted for fixing to a further, rotatable shaft, a cage containing a plurality of balls between said races and an annular fluid reservoir adapted for co-rotation with one of said races and wherein said cage has an annular extension which rotates within said reservoir and which, on contact with fluid therein, has a braking torque imparted thereto through friction, which reduces the speed of rotation of said cage and balls relative to the speed of said races.

2. A thrust bearing as claimed in claim 1 wherein said annular extension comprises a cylindrical portion extending axially from said cage and a flange portion extending radially of said cylindrical portion, from the free end thereof, into said reservoir.

3. A thrust bearing as claimed in claim 1 wherein said annular extension is cylindrical and extends axially from said cage into said reservoir.

4. A thrust bearing as claimed in any one of claims 1, 2 or 3 wherein said one race is the inner race.

5. A thrust bearing as claimed in claim 4 wherein said fluid is lubricating oil for lubricating said bearing and in operation, is directed from said bearing and through said fluid reservoir.

6. A thrust bearing as claimed in claim 5 wherein said first shaft is a fan shaft of a ducted fan, gas turbine engine and, said further shaft is a shaft of a compressor downstream of the fan of the same engine.

* * * * *